(12) United States Patent
Li

(10) Patent No.: US 7,756,677 B1
(45) Date of Patent: Jul. 13, 2010

(54) IMPLEMENTATION OF RIGOROUS COUPLED WAVE ANALYSIS HAVING IMPROVED EFFICIENCY FOR CHARACTERIZATION

(75) Inventor: Guoguang Li, Fremont, CA (US)

(73) Assignee: n&k Technology, Inc., San Jose, CA (US)

( * ) Notice: Subject to any disclaimer, the term of this patent is extended or adjusted under 35 U.S.C. 154(b) by 65 days.

(21) Appl. No.: 11/897,093

(22) Filed: Aug. 28, 2007

(51) Int. Cl.
*G06F 3/01* (2006.01)

(52) U.S. Cl. .................. 702/182; 702/183; 702/190; 702/194

(58) Field of Classification Search ............ 702/27, 702/28, 57, 76, 81, 155, 179, 182, 189; 250/251; 356/237.2, 625; 430/30
See application file for complete search history.

(56) References Cited

U.S. PATENT DOCUMENTS

| | | | |
|---|---|---|---|
| 6,891,626 B2 | 5/2005 | Niu et al. | |
| 6,952,271 B2 | 10/2005 | Niu et al. | |
| 7,031,894 B2 | 4/2006 | Niu et al. | |
| 7,099,005 B1 | 8/2006 | Fabrikant et al. | |
| 7,300,730 B1 * | 11/2007 | Willis et al. | 430/30 |
| 7,324,193 B2 * | 1/2008 | Lally et al. | 356/237.2 |
| 7,391,524 B1 * | 6/2008 | Chen et al. | 356/625 |

OTHER PUBLICATIONS

M.G. Moharam et al, Stable implementation of the rigorous coupled-wave analysis for surface- relief gratings: enhanced transmittance matrix approach, J. Opt. Soc. Am. A May 5, 1995,1077-1086 vol. 12 Orlando, Florida.
M.G. Moharam, et al, Formulation for stable and efficient implementation of the rigorous coupled- wave analysis of binary gratings J. Opt. Soc. Am. A/ vol. 12 May 5, 1995 1068-1076 Orlando, Florida.

* cited by examiner

*Primary Examiner*—Hal D Wachsman
*Assistant Examiner*—Felix E Suarez
(74) *Attorney, Agent, or Firm*—Lumen Patent Firm

(57) ABSTRACT

Improved optical characterization is provided by organizing the optical modeling calculations such that incident radiation parameters (e.g., wavelength) are varied in the outermost loop of any modeling run. By completing calculations for all combinations of structure parameters at one wavelength before moving to the next wavelength, calculation efficiency can be greatly improved. In particular, with this approach it is not necessary to cache (or re-compute) intermediate results pertaining to different wavelengths, in contrast to conventional approaches. Further improvements in efficiency can be obtained by organizing reflectance calculations such that for any layer $L_j$, stored intermediate results pertaining to layers below $L_j$ can be used to calculate optical response as parameters for $L_j$ and layers above $L_j$ are varied. Similarly, transmittance calculations can be organized such that for any layer $L_j$, stored intermediate results pertaining to layers above $L_j$ can be used to calculate optical response as parameters for $L_j$ and layers below $L_j$ are varied.

14 Claims, 6 Drawing Sheets

IMPLEMENTATION OF RIGOROUS COUPLED WAVE ANALYSIS HAVING IMPROVED EFFICIENCY FOR CHARACTERIZATION

FIELD OF THE INVENTION

This invention relates to optical modeling for characterization of diffracting patterns.

BACKGROUND

Optical process control measurements can often be regarded as methods for measuring parameters of a pattern. For example, a pattern can be a periodic one-dimensional grating of lines on the surface of a wafer, and the parameters to measure can be line width, line spacing and depth of the grating. To measure these parameters, an optical response of the pattern is measured. For example, reflectance as a function of wavelength can be measured. Typically, the optical response will depend on the parameter (or parameters) of interest in a complicated way such that direct parameter extraction from measured data is impractical. Instead, a mathematical model can be constructed for the pattern, having the parameters of interest as variables. Within the model, a modeled optical response is calculated corresponding to the measured optical response. The parameters of interest are then determined by adjusting the variables to fit the modeled response to the measured response.

A commonly-employed modeling approach for grating diffraction is known as the rigorous coupled wave analysis (RCWA). The RCWA is based on retaining a finite number of diffraction orders in the calculation, thereby allowing Maxwell's equations for the grating diffraction problem to be expressed as a system of matrix equations. The RCWA is well known and is described in many references, including Moharam et al., Journal of the Optical Society of America (JOSA), A12, n5, pp1068-1076, 1995, and Moharam et al., JOSA, A12, n5, pp1077-1086, 1995.

Since it is usually necessary to run a large number of cases to fit a modeled grating response to a measured grating response, methods of reducing RCWA calculation time are of special interest, and many approaches for reducing RCWA calculation time have been described. For example, in the second Moharam paper cited above, a layer by layer solution approach is described, where the system of matrix equations is basically solved one interface at a time, as opposed to solving for all interfaces simultaneously. This layer by layer approach can dramatically reduce the computation time compared to the simultaneous approach.

In this Moharam paper, it is also noted that in cases where it is not necessary to calculate both reflectance (R) and transmittance (T), the calculations can be modified to provide only the desired quantity and to significantly reduce computation time. This is in contrast to the more familiar case of R and T calculations relating to planar multi-layer stacks, where calculating only R or only T is not significantly faster than calculating both R and T.

Other approaches have also been considered for reducing RCWA calculation time. In some cases, it is possible to exploit symmetry to reduce calculation time.

For example, U.S. Pat. No. 6,898,537 considers calculations performed for modeling normal incidence illumination. At normal incidence, the positive and negative diffraction orders are not independent, so the RCWA can be reformulated to reduce matrix size, thereby reducing calculation time.

Another approach which has been considered for reducing RCWA calculation time is caching or storing intermediate results, such that recalculation of the cached intermediate results is avoided. Caching in connection with RCWA calculations is considered in U.S. Pat. No. 6,891,626, U.S. Pat. No. 6,952,271, U.S. Pat. No. 7,031,894, and U.S. Pat. No. 7,099,005. FIG. 1 shows a representative example of a conventional RCWA method along the lines of these references. In this example, step 102 is to measure a spectral reflectance (i.e., $R_{meas}(\lambda)$). Step 104 is to select a combination of parameter values for the grating. Step 106 is to calculate a modeled spectral reflectance (i.e., $R_{mod}(\lambda)$) for the selected parameter combination. Step 108 is to select a different set of parameter values and repeat the calculation until all combinations are calculated. Step 110 is to provide estimates of parameter values based on a best fit between modeled R and measured R. Step 112 is to cache intermediate results that can be reused, such as eigenvalues and eigenvector matrices.

Although the various known approaches for reducing RCWA calculation time can be more or less effective, depending on circumstances, there remains an ongoing need to further reduce RCWA calculation time.

SUMMARY

Improved optical characterization is provided by organizing the optical modeling calculations such that incident radiation parameters (e.g., wavelength) are varied in the outermost loop of any modeling run. By completing calculations for all combinations of structural parameters at one wavelength before moving to the next wavelength, calculation efficiency can be greatly improved. In particular, with this approach it is not necessary to cache (or re-compute) intermediate results pertaining to different wavelengths, in contrast to conventional approaches. Further improvements in efficiency can be obtained by organizing reflectance calculations such that for any layer $L_j$, stored intermediate results pertaining to layers below $L_j$ can be used to calculate optical response as parameters for $L_j$ and layers above $L_j$ are varied. Similarly, transmittance calculations can be organized such that for any layer $L_j$, stored intermediate results pertaining to layers above $L_j$ can be used to calculate optical response as parameters for $L_j$ and layers below $L_j$ are varied.

In broad terms, embodiments of the invention include methods of characterizing a diffraction structure (e.g., a grating) having one or more layers sandwiched between an incident medium and a substrate. The diffraction structure is illuminated with incident optical radiation, and an optical response of the diffraction structure is measured as a function of an incident radiation parameter (e.g., wavelength, angle of incidence). The diffraction structure has one or more structural parameters (e.g., layer thicknesses, indices of refraction, line widths, critical dimensions, etc.).

Estimates of one or more of the structural parameters are provided as an output by comparing the measured response to two or more modeled responses. Each modeled response corresponds to a set $S_k$ of values of structural parameters. Modeled responses for each set $S_k$ are calculated at a predetermined set of incident radiation parameter values $p_i$. These modeled responses are performed by nesting an inner loop running over all sets $S_k$ within an outer loop running over all values $p_i$. As a result, all modeled responses for each incident radiation parameter value are calculated before changing to the next incident radiation parameter value.

Principles of the invention are applicable to any kind of RCWA calculation, including but not limited to: rigorous coupled wave analysis (RCWA), 1-D RCWA, 2-D RCWA, RCWA simplified for plane of incidence parallel to lines of a 1-D grating, RCWA simplified for plane of incidence perpendicular to lines of a 1-D grating, RCWA simplified for normal incidence, and RCWA for conical diffraction.

An optical response of a grating (or other diffraction structure) can be a reflectance (any order), a zero-order reflectance, a transmittance (any order), a zero-order transmittance, or any combination thereof. In most cases it is preferred to work only with zero order reflectance or only with zero order transmittance, but characterization can be performed by measuring and modeling any number of reflected and/or transmitted diffraction orders.

DETAILED DESCRIPTION

Figure 1:
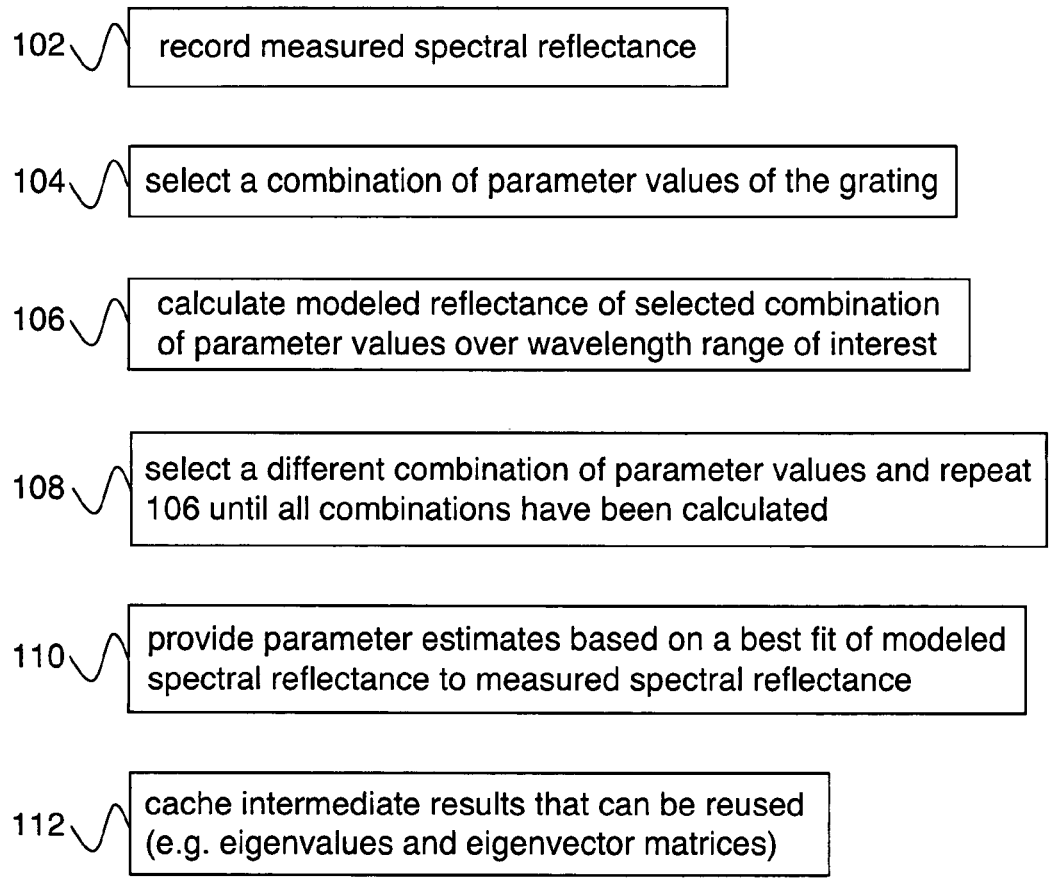
FIG. 1 shows a conventional RCWA method.

A significant motivation of the present invention can be appreciated by considering an example based on the conventional modeling approach of FIG. 1. The structure of interest is taken to be a 5-layer 1-D binary grating. Each layer has thickness and critical dimension (CD) as parameters, so the grating as a whole has 10 parameters. It is assumed that a library of spectra is desired, such that each parameter can take on any of 10 values. Thus $10^{10}$ spectra would need to be computed. As is known in the art, caching of intermediate results can reduce calculation time. However, the main point of this example is that conventional caching can entail significant loss of efficiency due to the load time of cached results.

More specifically, in this example it is assumed that RCWA eigenvalue and eigenvector matrices (Q and W respectively) for each layer are cached as functions of wavelength. Since $Q(\lambda)$ and $W(\lambda)$ do not depend on layer thickness, there are 10 sets of $Q(\lambda)$ and $W(\lambda)$ for each layer (10 CD values), so a total of 50 $Q(\lambda)$ and $W(\lambda)$ are stored. For reflectance calculations, it is most efficient to change the top layer ($1^{st}$ layer) parameters most rapidly and the bottom layer ($5^{th}$ layer) parameters least rapidly. Thus $Q(\lambda)$ and $W(\lambda)$ are loaded 10 times for the $5^{th}$ layer, 100 times for the $4^{th}$ layer, 1000 times for the $3^{rd}$ layer, $10^4$ times for the $2^{nd}$ layer, and $10^5$ times for the first layer, for a total of 111,110 $Q(\lambda)$ and $W(\lambda)$ loads.

If the number of wavelengths is 811 (e.g., 190 nm to 1000 nm at 1 nm intervals), and Q and W for a single wavelength and layer take 50 kB of storage, then the storage requirement for $Q(\lambda)$ and $W(\lambda)$ is about 40 MB. If it take 2s to load 40 MB, then 60 hours will be needed to perform the above 111,110 loads.

This undesirable load time can be reduced or eliminated by performing all calculations at one wavelength before moving to the next wavelength, as in embodiments of the invention. Recalculation of Q and W can be still be avoided by pre-calculating Q and W for each layer for all layer parameters. The storage requirement for these results is about 1 MB for this example. Since the space requirement is significantly reduced, these intermediate results can most likely be retained in main memory, thereby eliminating load time as a consideration. Even if caching to external storage (e.g., a hard disk) is required, the load time would decrease.

Figure 2:
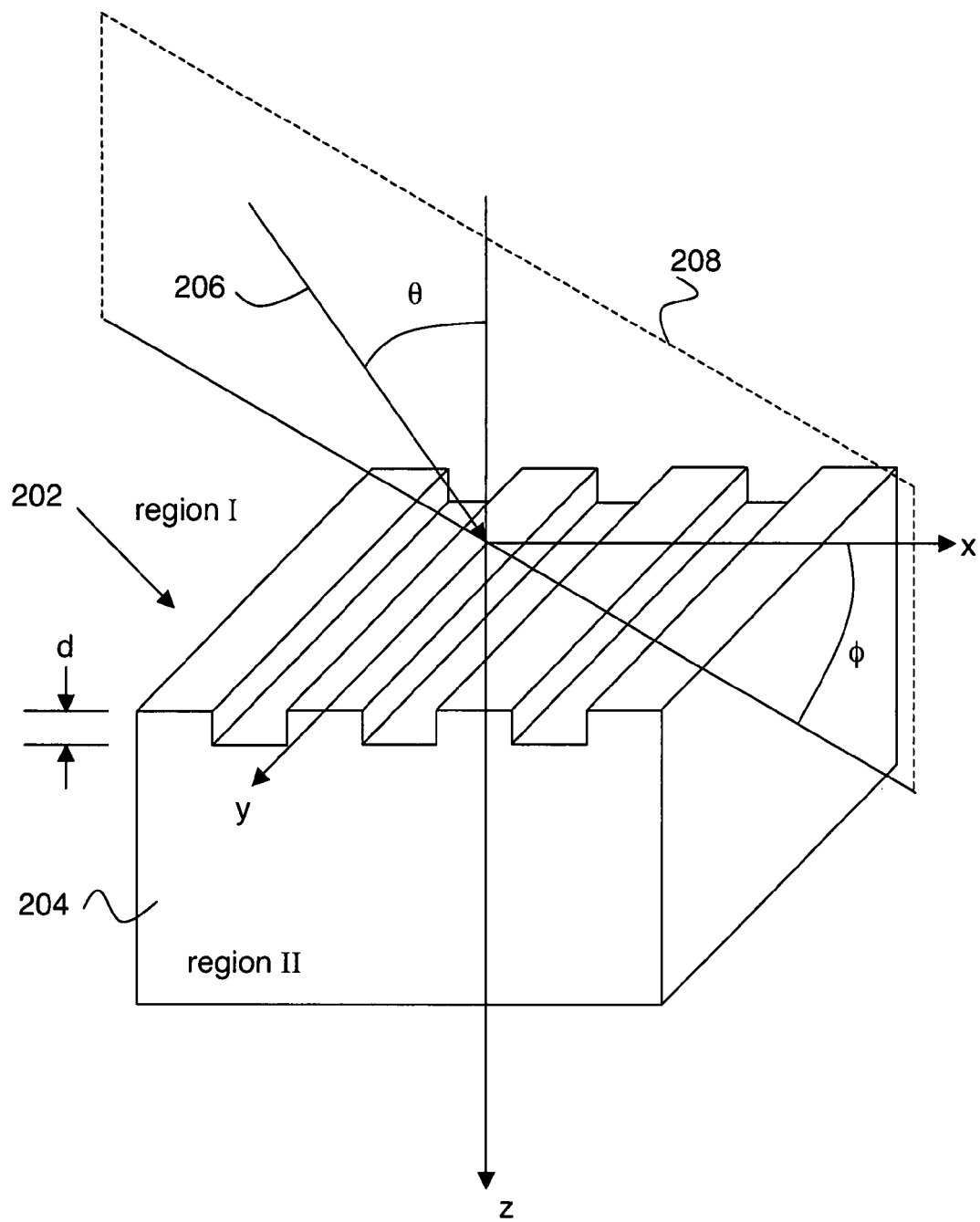
FIG. 2 shows grating diffraction geometry.

FIG. 2 shows general grating diffraction geometry. A grating 202 is sandwiched between an incident medium (region I) and a substrate 204 (region II). Light having a k vector 206 is incident on grating 202. Plane of incidence 208 is defined by k vector 206 and the surface normal to grating 202 (the z-axis). The angle of incidence θ is the angle between the grating surface normal and k vector 206. The azimuthal angle φ is the angle between plane of incidence 208 and the x axis on FIG. 2. Typically, coordinates are chosen such that the x axis is perpendicular to the grating lines, as shown. To better appreciate some of the principles of the present invention, it is helpful to consider a specific RCWA example in some detail.

Figure 3:
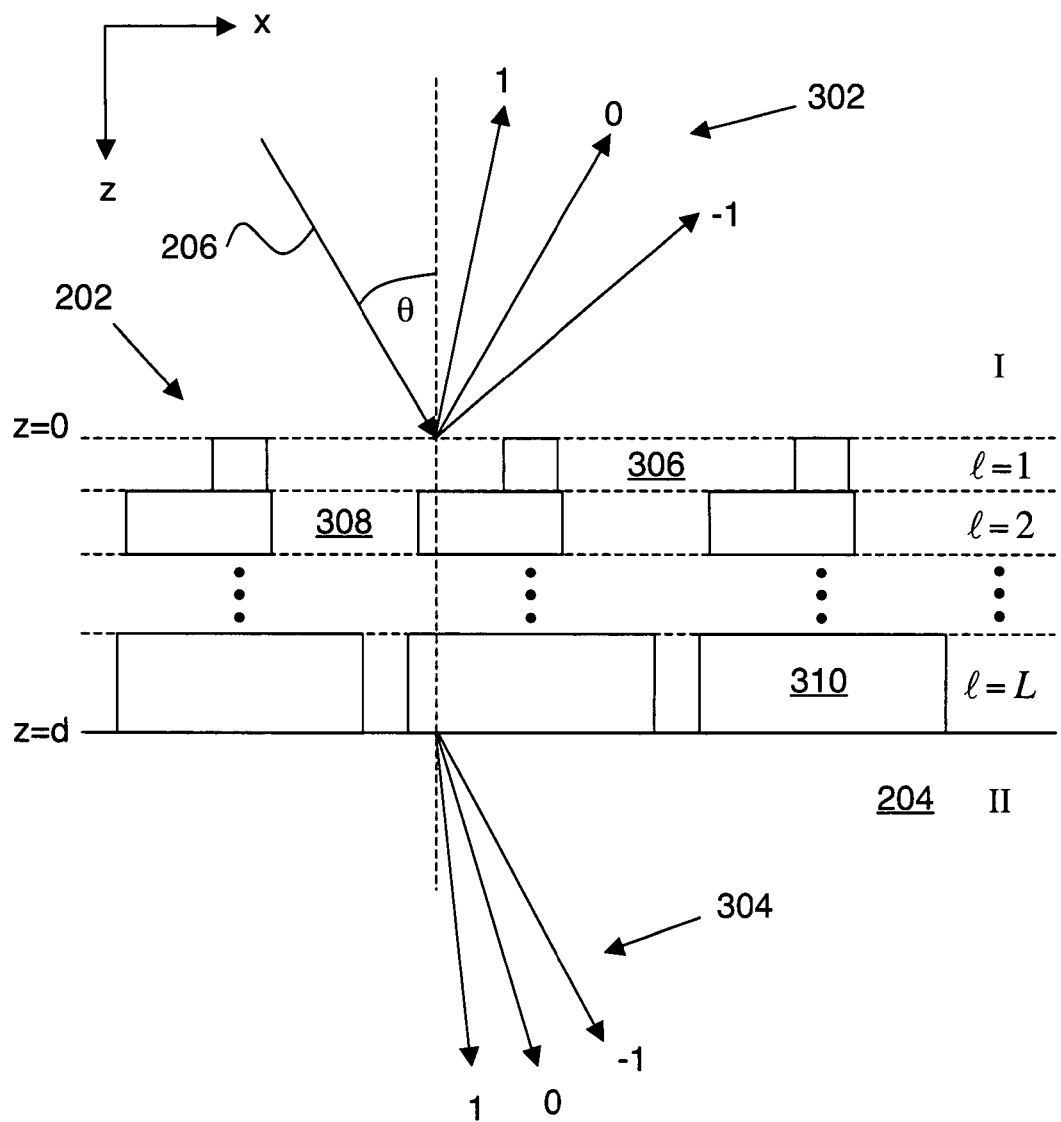
FIG. 3 shows diffraction geometry for a multi-layer grating.

This example relates to planar diffraction (i.e., φ=0) from a multi-layer one-dimensional grating. The pertinent geometry is shown in greater detail on FIG. 3. The grating includes one or more layers (e.g., layers 306, 308, and 310) arranged in a stack between regions I and II. Region I is the incident medium, and region II is the substrate. Regions I and II are modeled as homogeneous and semi-infinite media. The grating is taken to have L layers, indexed by l, where l increases from region I to region II. It is convenient to introduce the notation $L_l$ to refer to layer or region l, where $L_0$ is the incident medium, $L_{L+1}$ is the substrate, and $L_1 \ldots L_L$ are the grating layers. Each grating layer is translationally invariant in y and periodic in x, and all grating layers have the same period Λ. Gratings having arbitrary grating profiles can be approximately modeled in this manner by dividing the grating into multiple planar layers, as shown. FIG. 3 also shows some reflected orders 302 and some transmitted orders 304.

The basis for the RCWA is Fourier expansion of the dielectric constant in each grating layer, which gives $$\varepsilon_l(x) = \sum_n \varepsilon_{l,n} \exp\frac{j2n\pi}{\Lambda}x. \tag{1}$$

It is helpful to define a permittivity matrix E as follows $$E_{l,ij} = \varepsilon_{l,i-j}.$$

The Fourier expansion of the inverse permittivity 1/ε is also useful, as defined by $$\frac{1}{\varepsilon_l(x)} = \sum_n \left(\frac{1}{\varepsilon}\right)_{l,n} \exp\frac{j2n\pi}{\Lambda}x, \tag{3}$$

where the corresponding inverse permittivity matrix F is given by $$F_{l,ij} = \left(\frac{1}{\varepsilon}\right)_{l,i-j}. \tag{4}$$

The quantities of interest in an RCWA calculation are reflectances and/or transmittances for each diffracted order included in the calculation. These quantities, R and T, are defined by the following field expansions in regions I and II:

$$E_{I,y} = \exp[-jk_0 n_I(x\sin\theta + z\cos\theta)] + \sum_i R_i \exp[-j(k_{xi} - k_{I,zi}z)] \qquad (5)$$

$$E_{II,y} = \sum_i T_i \exp[-j(k_{xi}x + k_{II,zi}(z-d))],$$

for incident TE polarization and $$H_{I,y} = \exp[-jk_0 n_I(x\sin\theta + z\cos\theta)] + \sum_i R_i \exp[-j(k_{xi}x - k_{I,zi}z)] \qquad (6)$$

$$H_{II,y} = \sum_i T_i \exp[-j(k_{xi}x + k_{II,zi}(z-d))],$$

for incident TM polarization. Here the sums run over the diffracted orders included in the calculation, and $k_{xi}$ and $k_{xi}$ are given by $$k_{xi} = k_0[n_I \sin\theta - i\lambda_0/\Lambda], \qquad (7)$$

and $$k_{I,zi} = \begin{cases} k_0\sqrt{n_I^2 - (k_{xi}/k_0)^2} & Re(k_{I,zi}) > Im(k_{I,zi}) \\ -jk_0\sqrt{(k_{xi}/k_0)^2 - n_I^2} & Re(k_{I,zi}) < Im(k_{I,zi}) \end{cases}. \qquad (8)$$

Here l=0 (region I, incident medium) or l=L+1 (region II, substrate).

For this situation, Maxwell's equations can be expressed as the following system of matrix equations:

$$\begin{bmatrix} D_1 \\ D_2 \end{bmatrix} + \begin{bmatrix} I \\ -jK_I \end{bmatrix} R = \begin{bmatrix} W_1 & W_1 X_1 \\ V_1 & -V_1 X_1 \end{bmatrix} \begin{bmatrix} c_1^+ \\ c_1^- \end{bmatrix}, \qquad (9)$$

$$\begin{bmatrix} W_{l-1} X_{l-1} & W_{l-1} \\ V_{l-1} X_{l-1} & -V_{l-1} \end{bmatrix} \begin{bmatrix} c_{l-1}^+ \\ c_{l-1}^- \end{bmatrix} = \begin{bmatrix} W_l & W_l X_l \\ V_l & -V_l X_l \end{bmatrix} \begin{bmatrix} c_l^+ \\ c_l^- \end{bmatrix}, \text{ and} \qquad (10)$$

$$\begin{bmatrix} W_L X_L & W_L \\ V_L X_L & -V_L \end{bmatrix} \begin{bmatrix} c_L^+ \\ c_L^- \end{bmatrix} = \begin{bmatrix} I \\ -jK_{II} \end{bmatrix} T. \qquad (11)$$

Each planar interface of the grating gives rise to its own matrix equation in this system. More specifically, Eqs. 9 relate to the interface between region I and the grating, Eqs. 11 relate to the interface between region II and the grating, and Eqs. 10 relate to each planar interface within the grating. For example, if the grating has three layers, then Eqs. 10 apply at the interface between grating layers 1 and 2, and to the interface between grating layers 2 and 3. If the grating has only one layer, then Eqs. 9 and 11 provide a complete model, and Eqs. 10 are not necessary.

In Eqs. 9-11, $c_l^+$ and $c_l^-$ are + and − propagating field amplitudes in layer l. The matrices D and K in Eqs. 9-11 are defined as follows:

$$D_1 = \delta_{i0}, \qquad (12)$$

$$D_2 = j\delta_{i0} f(\theta), \qquad (13)$$

where $$f(\theta) = \begin{cases} n_I \cos\theta & TE \\ \cos\theta/n_I & TM \end{cases}, \qquad (14)$$

$$K_I = \begin{cases} k_{I,zi}\delta_{ij}/k_0 & TE \\ k_{I,zi}\delta_{ij}/k_0 n_I^2 & TM \end{cases}, \text{ and} \qquad (15)$$

$$K_{II} = \begin{cases} k_{II,zi}\delta_{ij}/k_0 & TE \\ k_{II,zi}\delta_{ij}/k_0 n_{II}^2 & TM \end{cases}. \qquad (16)$$

For incident TE polarization, V and W are given by:

$$K_x = k_{xi}\delta_{ij}/k_0, \qquad (17)$$

$$A_l = K_x^2 - E_l, \qquad (18)$$

$$A_l = W_l^{-1} Q_l Q_l W_l, \qquad (19)$$

and $$V_l = W_l Q_l. \qquad (20)$$

Here Q is a diagonal matrix of positive square roots of eigenvalues of A, and W is the corresponding eigenvector matrix of A.

For incident TM polarization, V and W are given by:

$$B_l = K_x E_l^{-1} K_x - I, \qquad (21)$$

$$F_l^{-1} B = W_l^{-1} Q_l Q_l W_l, \qquad (22)$$

and $$V_l = E_l^{-1} W_l Q_l \text{ tm} \qquad (23)$$

Here Q is a diagonal matrix of positive square roots of eigenvalues of $F^{-1}B$, and W is the corresponding eigenvector matrix of $F^{-1}B$.

The matrix X in Eqs. 9-11 is given by $$X_l = \delta_{ij} \exp(-k_0 Q_{l,ii} d_l). \qquad (24)$$

Here $d_l$ is the thickness of grating layer l. The matrix X is the only quantity in Eqs. 9-11 that depends on grating layer thickness.

Although it is possible to solve Eqs. 9-11 with a "brute force" approach where R, T and all internal field amplitudes are simultaneously solved for, it tends to be much more efficient in practice to solve the equations sequentially. In a sequential approach, calculations are initialized at the top or bottom of the grating, and then proceed across the grating. In many cases of practical interest, it is not necessary to calculate both R and T, so further efficiency can be obtained by calculating only R or only T. If R is the quantity of interest, it is best to start at layer L and end at layer 1. If T is the quantity of interest, then it is best to start at layer 1 and end at layer L.

More specifically, one approach for calculating R is based on defining a matrix a via $$c_l^- = a_l c_l^+. \qquad (25)$$

From Eqs. 9-11, a is given by $$a_l = (V_l + g_{l+1} f_{l+1}^{-1} W_l)^{-1} (V_l - g_{l+1} f_{l+1}^{-1} W_l) X_l, \qquad (26)$$

where $f_{L+1} = I$, $g_{L+1} = jK_{II}$, and f and g are given by $$\begin{bmatrix} f_l \\ g_l \end{bmatrix} = \begin{bmatrix} W_l(I + X_l a_l) \\ V_l(I - X_l a_l) \end{bmatrix}, \quad (27)$$

within the grating. Eqs. 26-27 can be solved sequentially for a, f, and g in each grating layer starting at layer L and ending at layer 1. Once this is done, the reflectance R is given by:

$$R = f_1(g_1 + jKf_1)^{-1}(D_2 + jK_ID_1) - D_1 \quad (28)$$

A similar approach for calculating T can be developed, based on defining matrices a and b via $$c_l^+ = a_l c_l^- + b_l. \quad (29)$$

From Eqs. 9-11, a and b are given by $$a_l = (V_l + g_{l-1}f_{l-1}^{-1}W_l)^{-1}(V_l - g_{l-1}f_{l-1}^{-1}W_l)X_l, \quad (30)$$

$$b_l = (V_l + g_{l-1}f_{l-1}^{-1}W_l)^{-1}(V_{l-1} + g_{l-1}f_{l-1}^{-1}W_{l-1})X_{l-1}b_{l-1}, \quad (31)$$

where $f_0 = X_0 = W_0 = I$, $g_0 = jK_I$, $b_0 = \delta_{i0}$, $V_0 = jf(\theta)I$, and f and g are given by $$\begin{bmatrix} f_l \\ g_l \end{bmatrix} = \begin{bmatrix} W_l(I + X_l a_l) \\ V_l(I - X_l a_l) \end{bmatrix} \quad (32)$$

within the grating. Eqs. 30-32 can be solved sequentially for a, b, f, and g in each grating layer starting at layer 1 and ending at layer L. Once this is done, the transmittance T is given by:

$$T = (g_L f_L^{-1} + jK_{II})^{-1}(g_L f_L^{-1} W_L + V_L)X_L b_L \quad (33)$$

The sequential approaches for calculating R alone (Eqs. 26-28) and T alone (Eqs. 30-33) are the key results of this example. Although the following description of some preferred embodiments of the invention will make reference to this example for clarity of description, the principles of the invention are broadly applicable to any kind of RCWA analysis.

Figure 4:
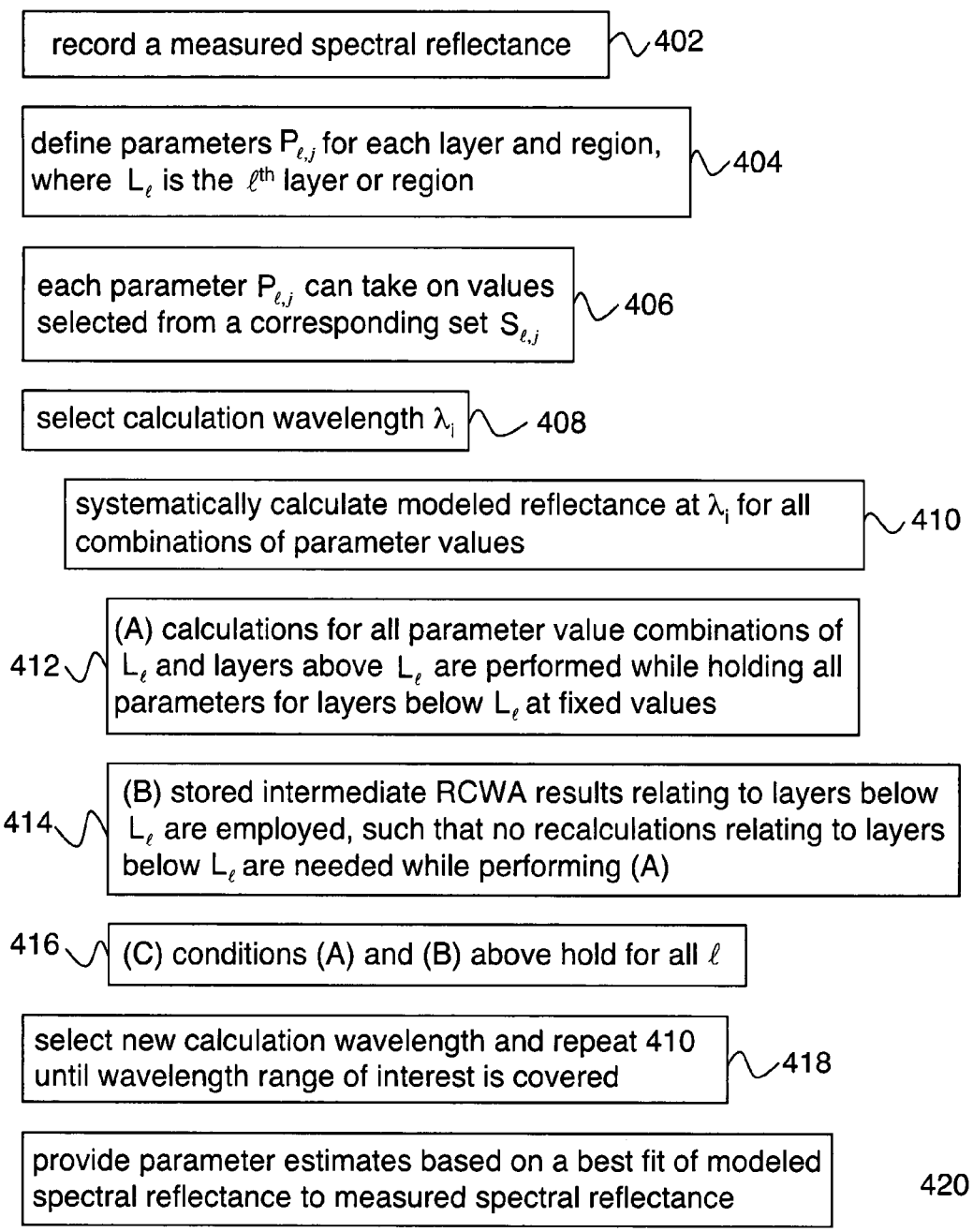
FIG. 4 shows an RCWA method according to an embodiment of the invention.

FIG. 4 shows an RCWA method according to a first preferred embodiment of the invention. Step 402 is to record a measured spectral reflectance from the sample of interest. Any reflected order can be selected, but it is typically preferred to measure the zero-order reflectance. Step 404 is to define parameters $P_{l,j}$ for each layer and region, where $L_l$ is the $l^{th}$ layer or region, and j indexes the parameters. As described above, the index l runs from 0 to L+1, such that $L_0$ is region I (the incident region), $L_{L+1}$ is region II (the substrate) and $L_l$ for $1 \leq l \leq L$ is grating layer l.

The parameters $P_{l,j}$ are structural parameters of the diffraction grating, and can include any physical or geometrical properties of a grating layer or region that can affect an optical response of the grating. Such parameters include, but are not limited to: 1-D grating period, 2-D grating periods, layer thickness, layer line width, layer space width, layer critical dimension, layer lateral feature dimensions, layer refractive index, layer complex refractive index, substrate refractive index, and substrate complex refractive index.

Step 406 indicates that each parameter $P_{l,j}$ can take on values selected from a corresponding set $S_{l,j}$. For example, if $P_{3,1}$ is the thickness of layer 3, and $P_{3,2}$ is the line width of layer 3, then $S_{3,1}$ is the set of thicknesses to model for layer 3, and $S_{3,2}$ is the set of linewidths to model for layer 3. It is helpful to define combined sets $S_k$, indexed by k, such that each $S_k$ is a set of values for all relevant structural parameters of the grating, and every parameter combination of interest is included as one of the $S_k$. For example, if a single layer grating has three parameters of interest, thickness, line width, and refractive index, and each parameter can take on any of 10 values, then there would be $3^{10}$ different sets $S_k$, each corresponding to one of the possible combinations of parameter values. By calculating a modeled response for each of the $S_k$, a library of modeled responses can be constructed for use in characterization.

As another example, $S_k$ can include two sets differing only by a small change in value of a selected structural parameter. This situation can arise when it is necessary to provide an estimate of the derivative of the optical response with respect to the selected structural parameter. Since many curve fitting procedures require derivative estimates, or converge more rapidly when provided with derivative estimates, such numerical derivative capability is helpful in practice. In particular, so-called "real-time" or "adaptive" curve fitting approaches (as opposed to the library approach described above) typically benefit from having numerical derivative estimates.

Step 408 is to select a calculation wavelength $\lambda_i$. Wavelength is a representative example of an incident radiation parameter. Other possible incident radiation parameters include frequency (which is equivalent to wavelength) and angle of incidence. As indicated above, a key aspect of the invention is to vary the incident radiation parameter in the outermost loop of the modeling calculations. In the example of FIG. 4, all calculations needed at one wavelength are performed before moving to the next wavelength. The main reason it is helpful to vary the wavelength in the outermost loop is that everything in an RCWA calculation depends on the wavelength and other incident radiation parameters (e.g., W and Q in every layer), so once there is a change of wavelength, a complete recalculation is needed. In contrast to wavelength, changing a structural parameter of the grating does not change everything in an RCWA calculation (e.g., W and Q change in at most one layer), and significant intermediate results can typically be retained and reused, thereby reducing calculation time.

Step 410 is to systematically calculate modeled reflectance at $\lambda_i$ for all combinations of parameter values (i.e., all sets $S_k$). A sequential approach, as in Eqs. 26-28 above is preferred, where conditions 412, 414, and 416 hold. Let $L_l$ be the lth layer in the grating structure. Condition 412 indicates that calculations for all parameter value combinations relating to $L_l$ and layers above $L_l$ are performed while holding all parameters for layers below $L_l$ at fixed values. Condition 414 indicates that stored intermediate RCWA results relating to layers below $L_l$ are employed, such that no recalculation relating to layers below $L_l$ are needed when varying the parameters of $L_l$ and layers above $L_l$. For example, $f_{l+1}$ and $g_{l+1}$ in Eqs. 26-27 are a complete set of intermediate results for all layers below $L_l$. Condition 416 indicates that conditions 412 and 414 apply for $1 \leq l \leq L$. Here $L_n$ is above $L_m$ if n<m, where n and m are any two possible values of the layer index l.

Step 418 is to select a new wavelength and repeat the calculation of 410 at the new wavelength. New wavelengths are selected until the wavelength range of interest is covered. Step 420 is to provide estimates of grating structural parameters based on a best fit of modeled reflectance to measured reflectance. Such estimates can be provided as output to an end user and/or to an automated process monitor.

Figure 5:
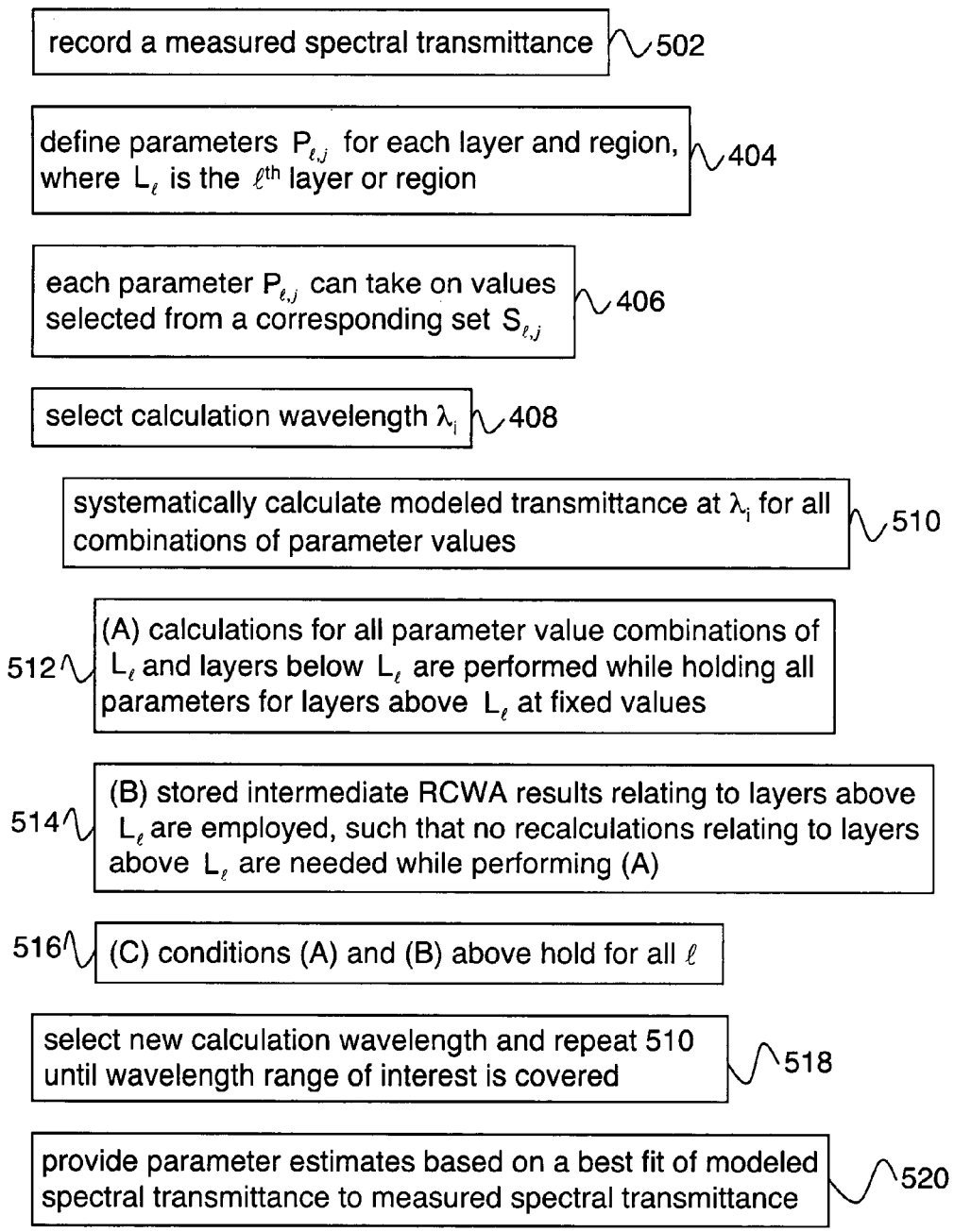
FIG. 5 shows an RCWA method according to another embodiment of the invention.

FIG. 5 shows an RCWA method according to a second preferred embodiment of the invention. This method is similar to the method of FIG. 4, except that transmittance is measured and modeled as opposed to reflectance. Step 502 is to record a measured spectral transmittance from the sample of interest. Any transmitted order can be selected, but it is typically preferred to measure the zero-order transmittance. Steps 404, 406 and 408 are as described in connection with FIG. 4.

Step 510 is to systematically calculate modeled transmittance at $\lambda_i$ for all combinations of parameter values (i.e., all sets $S_k$). A sequential approach, as in Eqs. 30-33 above is preferred, where conditions 512, 514, and 516 hold. Let $L_l$ be the lth layer in the grating structure. Condition 512 indicates that calculations for all parameter value combinations relating to $L_l$ and layers below $L_l$ are performed while holding all parameters for layers above $L_l$ at fixed values. Condition 514 indicates that stored intermediate RCWA results relating to layers above $L_l$ are employed, such that no recalculation relating to layers above $L_l$ are needed when varying the parameters of $L_l$ and layers below $L_l$. For example, $f_{l-1}$, $g_{l-1}$, $V_{l-1}$, $W_{l-1}$, $X_{l-1}$, and $b_{l-1}$ in Eqs. 30-31 are a complete set of intermediate results for all layers above $L_l$. Condition 516 indicates that conditions 512 and 514 apply for $1 \leq l \leq L$.

Step 518 is to select a new wavelength and repeat the calculation of 510 at the new wavelength. New wavelengths are selected until the wavelength range of interest is covered. Step 520 is to provide estimates of grating structural parameters based on a best fit of modeled transmittance to measured transmittance. Such estimates can be provided as output to an end user and/or to an automated process monitor.

Figure 6:
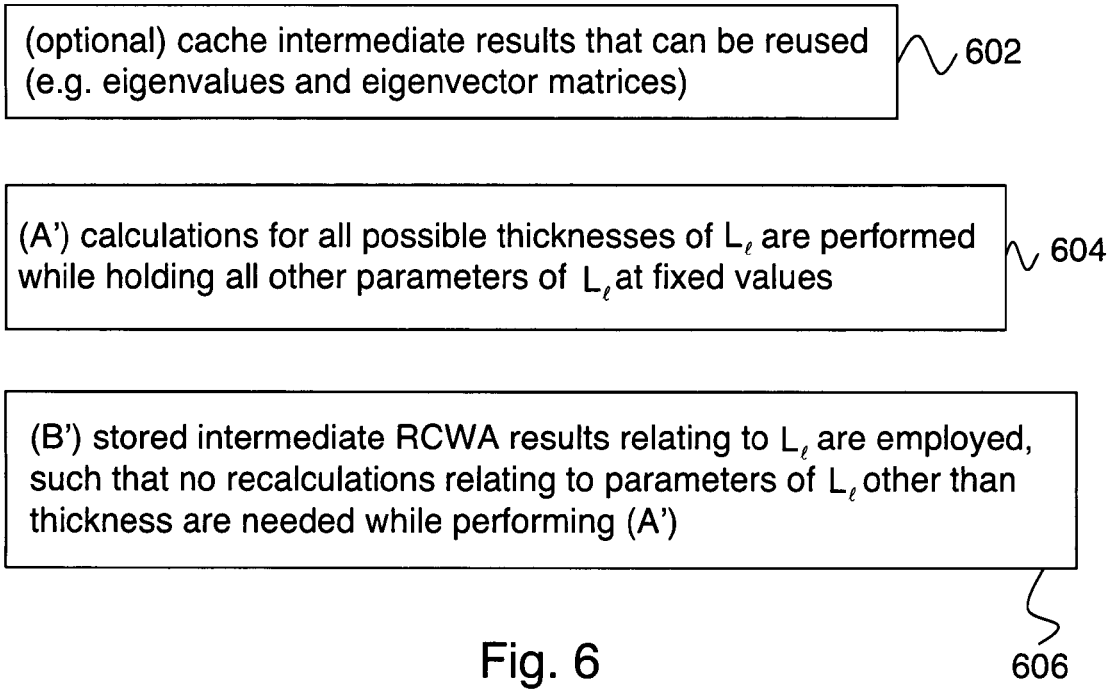
FIG. 6 shows some optional method steps that can be included in embodiments of the invention.

FIG. 6 shows some optional method steps that can be included in embodiments of the invention. Optional step 602 is to cache intermediate results that can be reused (e.g., the eigenvalue and eigenvector matrices Q and W, and the V matrix). For example, in a three layer structure having 5 different line widths to model, $3^5$=243 combinations of Q, W, and V can be cached (or retained in main memory). As used herein, a result is "cached" if it is retained for re-use as long as necessary. Whether the cached result is retained in computer memory or externally stored (e.g., on a hard disk) is irrelevant here. Since Q and W are obtained as a result of relatively time consuming eigenvalue decomposition calculations, it is significantly beneficial to cache these results.

Note that caching as described here and organizing the calculations as described above are logically distinct. Thus embodiments of the invention can include or not include caching. Similarly, conventional RCWA approaches (i.e., not requiring incident radiation parameters to be held fixed as calculations for all structural parameter value combinations are performed) can also include or not include caching.

In some cases, the approach of optional steps 604 and 606 is possible, where calculations for all possible thicknesses of $L_l$ are performed while holding all other parameters of $L_l$ at fixed value. Stored intermediate results pertaining to all non-thickness parameters of $L_l$ are employed such that no recalculations relating to parameters other than thickness are required while varying the thickness. In following this approach, it can be helpful to isolate the thickness dependence in the RCWA to the maximum extent.

For example, if reflectance is of interest, it is helpful to make the following substitution in Eqs. 26-27:

$$a_l = a'_l X_l. \tag{34}$$

The resulting equations corresponding to Eqs. 26-27 are given by $$a'_l = (V_l + g_{l+1} f_{l+1}^{-1} W_l)^{-1} (V_l - g_{l+1} f_{l+1}^{-1} W_l), \tag{35}$$

$$\begin{bmatrix} f_l \\ g_l \end{bmatrix} = \begin{bmatrix} W_l(I + X_l a'_l X_l) \\ V_l(I - X_l a'_l X_l) \end{bmatrix}. \tag{36}$$

The effect of this substitution is to render $a'_l$ independent of the thickness of the current layer (i.e., layer l). Thus the thickness of a particular layer can be varied while holding a' for that layer constant as an intermediate result. More specifically, only Eqs. 36 need to be recalculated as thickness changes. In contrast, Eqs. 26 and 27 both have to be recalculated as thickness changes. This approach can be applied for every layer, or to any subset of the layers. In cases where only a subset of layers follow this thickness-first approach, it is preferred for the top or top few layers to be treated as thickness first, since the benefits of doing so are greatest at the top layer for R calculations.

Similarly, if transmittance is of interest, it is helpful to make the following substitution in Eqs. 30 and 32

$$a_l = a'_l X_l. \tag{37}$$

The resulting equations corresponding to Eqs. 30 and 32 are given by $$a'_l = (V_l + g_{l-1} f_{l-1}^{-1} W_l)^{-1} (V_l - g_{l-1} f_{l-1}^{-1} W_l), \tag{38}$$

$$\begin{bmatrix} f_l \\ g_l \end{bmatrix} = \begin{bmatrix} W_l(I + X_l a'_l X_l) \\ V_l(I - X_l a'_l X_l) \end{bmatrix}. \tag{39}$$

The effect of this substitution is to render $a'_l$ independent of the thickness of the current layer (i.e., layer l). From Eq. 31, it is apparent that $b_l$ does not depend on the thickness of layer l, although it does depend on the thickness of layer l−1. Accordingly, no substitution is needed to remove thickness dependence of b. Thus the thickness of a particular layer can be varied while holding a' and b for that layer constant as intermediate results. More specifically, only Eqs. 39 need to be recalculated as thickness changes. In contrast, Eqs. 30 and 32 both have to be recalculated as thickness changes. This approach can be applied for every layer, or to any subset of the layers. In cases where only a subset of layers follow this thickness-first approach, it is preferred for the bottom or bottom few layers to be treated as thickness first, since the benefits of doing so are greatest at the bottom layer for T calculations.

Figure 7:
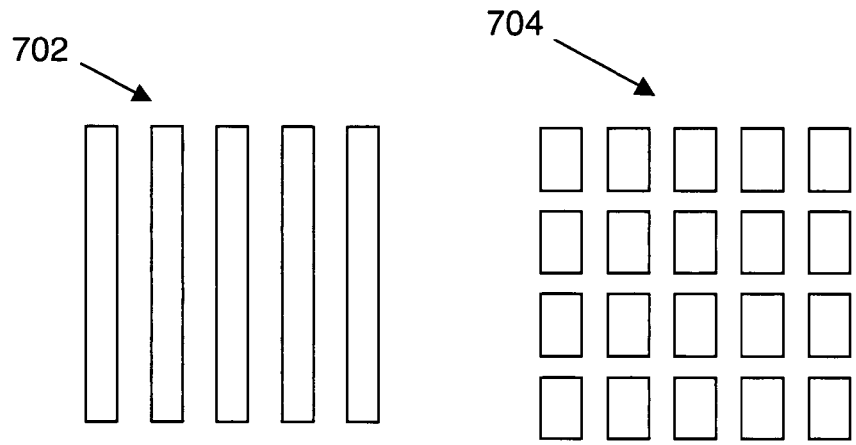
FIG. 7 shows examples of 1-D and 2-D gratings.

FIG. 7 shows examples of 1-D and 2-D gratings. Grating 702 is an example of a 1-D grating, and grating 704 is an example of a 2-D grating. The invention is applicable to modeling of 1-D or 2-D gratings. Although 2-D RCWA calculations are more complicated than the 1-D example given above, the principles of the invention are applicable to the 2-D case.

The invention claimed is:

1. A method of characterizing a diffraction structure having one or more layers sandwiched between an incident medium and a substrate, wherein $L_l$ is the lth of said layers and wherein said index l increases from incident medium to substrate, the method comprising:
   a) illuminating said diffraction structure with incident optical radiation, wherein said diffraction structure has one or more structural parameters;
   b) measuring an optical response of said diffraction structure as a function of an incident radiation parameter p;

c) calculating two or more modeled optical responses of said diffraction structure corresponding to two or more sets $S_k$ of values of said structural parameters at a predetermined set of incident radiation parameter values $p_i$;

d) providing said two or more modeled optical responses as inputs to a procedure for providing estimates of one or more of said structural parameters;

e) providing said estimates of said one or more structural parameters as an output;

f) wherein said calculating is performed by nesting an inner loop running over all sets $S_k$ within an outer loop running over all values $p_i$, whereby all modeled responses for each incident radiation parameter value are calculated before changing to the next incident radiation parameter value.

2. The method of claim 1, further comprising caching intermediate calculation results and using said cached intermediate results instead of recalculating said cached intermediate results.

3. The method of claim 2, wherein said cached intermediate results comprise rigorous coupled wave analysis (RCWA) eigenvalue and eigenvector matrices for each of said layers.

4. The method of claim 1, wherein said measured optical response is a reflectance and said modeled optical responses are reflectances.

5. The method of claim 4, wherein m is an integer index, wherein a layer $L_m$ can be selected from any of said $L_l$ layers such that intermediate calculation results relating to layers having l>m are stored, and wherein calculations for all structural parameter value combinations relating to layers having l≦m are performed with said stored intermediate results, whereby recalculation relating to layers having l>m is not required as structural parameters relating to layers having l≦m are varied.

6. The method of claim 1, wherein said measured optical response is a transmittance and said modeled optical responses are transmittances.

7. The method of claim 6, wherein m is an integer index, wherein a layer $L_m$ can be selected from any of said $L_l$ layers such that intermediate calculation results relating to layers having l<m are stored, and wherein calculations for all structural parameter value combinations relating to layers having l≧m are performed with said stored intermediate results, whereby recalculation relating to layers having l<m is not required as structural parameters relating to layers having l≧m are varied.

8. The method of claim 1, wherein for each of said layers, intermediate calculation results relating to structural parameters of said each layer other than layer thickness are stored, and wherein calculations for various thicknesses of said each layer are performed with said stored intermediate results, whereby recalculation relating to non-thickness layer parameters is not required as thickness is varied.

9. The method of claim 1, wherein said two or more sets $S_k$ comprise two sets differing only by a small change in value of a selected structural parameter, whereby a numerical derivative of said selected structural parameter can be derived.

10. The method of claim 1, wherein said calculating comprises a single method selected from the group consisting of: rigorous coupled wave analysis (RCWA), one-dimensional RCWA, two-dimensional RCWA, RCWA simplified for plane of incidence parallel to lines of a one-dimensional grating, RCWA simplified for plane of incidence perpendicular to lines of a one-dimensional grating, RCWA simplified for normal incidence, and RCWA for conical diffraction.

11. The method of claim 1, wherein said incident radiation parameter is selected from the group consisting of: wavelength, frequency, and angle of incidence.

12. The method of claim 1, wherein said structural parameters comprise one or more parameters selected from the group consisting of: one-dimensional grating period, two-dimensional grating periods, layer thickness, layer line width, layer space width, layer critical dimension, layer lateral feature dimensions, layer refractive index, layer complex refractive index, substrate refractive index, and substrate complex refractive index.

13. The method of claim 1, wherein said diffraction structure comprises a one-dimensional or two-dimensional diffraction grating.

14. The method of claim 1, wherein said optical response is selected from the group consisting of: reflectance, transmittance, zero-order reflectance, and zero-order transmittance.

\* \* \* \* \*